Aug. 1, 1939.  C. W. AVERY  2,167,863

SEAT FRAME

Filed July 23, 1937

INVENTOR.
Clarence W. Avery.
BY
Harness, Dickey & Pierce.
ATTORNEYS.

Patented Aug. 1, 1939

2,167,863

UNITED STATES PATENT OFFICE 2,167,863

SEAT FRAME

Clarence W. Avery, Detroit, Mich., assignor to The Murray Corporation of America, Detroit, Mich., a corporation of Delaware Application July 23, 1937, Serial No. 155,286

5 Claims. (Cl. 155—180)

My invention relates to seat cushions, and particularly a seat cushion frame and spring supporting elements which are welded together to provide a unique and rigid construction.

Frames have been made heretofore out of channel elements having flanges which may be overlapped and welded together to form a unit structure. The flanges provide support for braces and grid members and a means whereby the supports and members could be welded to the frame. In view of the projecting flange, difficulty was experienced in rounding the corners of the frame while retaining the flange in a common plane.

In practicing my present invention, I provide an extremely rigid frame which may be constructed from a single strip of material bent at the corners to form the sides and end members of the frame. The frame element is of channel shape, having a tacking strip disposed thereon, and provided with a shouldered portion in the web of the channel between which the braces and grid elements are received. Indirect welding preferably is employed to provide a flow of current through the flanges of the channel to the web where the braces and grid elements are welded.

To provide a greater degree of localization at the weld area, a longitudinally disposed bead may be provided in the web of the element. To provide greater contact pressure between the welding electrode, the flanges of the channel element are converged so that the pressure between the electrodes forces the channel element into more intimate relation with the electrode with which it engages. Shot welding is employed for controlling the time and duration of the flow of current relative to its cycle of alternation to insure perfect welds in a minimum time. This reduces the duration of heat on the tacking material which was found to be unaffected by the weld when produced in the manner above set forth.

Accordingly, the main objects of my invention are, to provide a frame for a cushion made from a continuous strip of material of channel section having a tacking element disposed therein and provided with a shoulder on the web portion between which braces and spring supporting elements may be disposed; to provide a section for a seat frame of channel shape having a shoulder in the web portion for limiting the contact area between braces and spring supporting elements to be welded thereto; to form a frame from a channel element having converging side flanges through which current is conducted to produce indirect welding; to provide a bead longitudinally of the web of a channel frame element with which braces and grid elements may contact and be welded; to provide a channel element having converging sides with a projecting shoulder in the web and a bead between the shoulder and opposite flange to produce localized contact areas for elements to be welded thereto; and in general, to provide a frame for a seat construction which is rigid in construction and economical of manufacture.

Other objects and features of novelty of my invention will be either specifically pointed out or will become apparent when referring for a better understanding of my invention to the following description taken in conjunction with the accompanying drawing, wherein.

Figure 1:
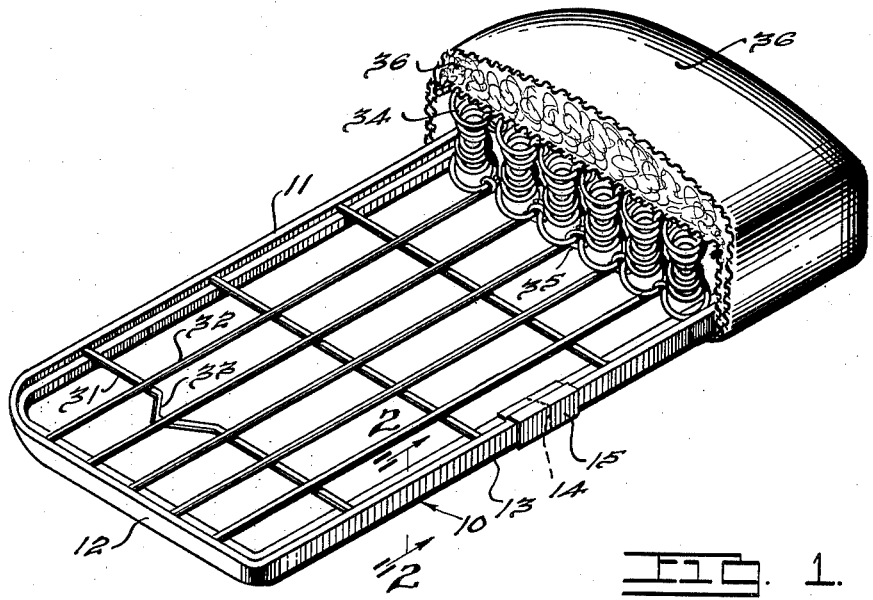
Fig. 1 is a view in perspective of a frame for a seat cushion embodying my invention, a portion of which is shown in section.

The cushion structure as illustrated in Fig. 1 embodies a frame 10, which is continuous, forming the front edge 11, the two side edges 12, and the rear edge 13 of the frame. The ends of the elements are joined together at the rear edge, at 14, and secured together by an encompassing strip 15 which is welded thereto.

Figures 2, 3, 4:
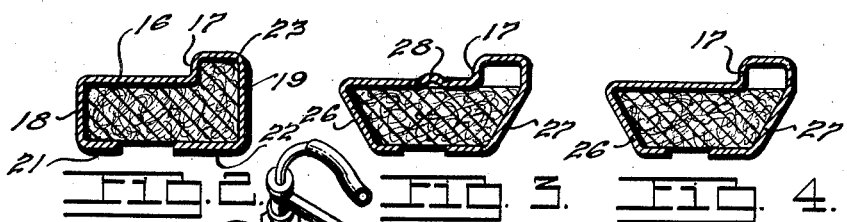
Fig. 2 is a sectional view of the structure illustrated in Fig. 1, taken on the line 2—2 thereof.
Fig. 3 is a view of the structure, similar to that illustrated in Fig. 2, showing a modified form thereof.
Fig. 4 is a view of structure, similar to that illustrated in Fig. 3, showing a further form which my invention may assume; and, Fig. 5 is a perspective view of a pair of electrodes, with a frame and bracing element being welded therebetween.
Figure 5:
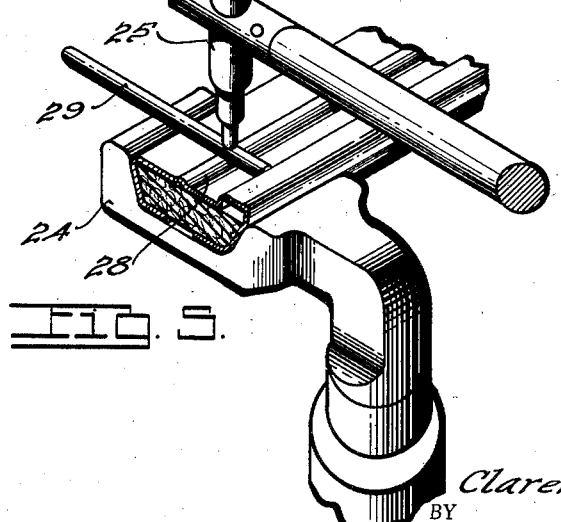

In Fig. 2, I have illustrated a cross section of the frame element 10, which is substantially of channel shape. The web portion 16 of the channel is offset at 17 to provide a shoulder, with the side flanges 18 and 19 projected inwardly at 21 and 22 to encompass the tacking material 23 which is illustrated as completely filling the area encompassed by the section. The projection 17 of the web limits the length of material which may be disposed thereupon to thereby limit the area of contact between braces, supporting wires and the like which are welded thereto. Welding is preferably produced by the indirect method, having one electrode 24 engaging the element from below while an electrode 25 is disposed above the frame element to impinge upon the brace, wire, or other member to be secured to the web 16 of the element. The shoulder is also useful in preventing the raw edges of the material employed in the braces, wires, etc., from tearing the padding or fabric material which is protected to a greater degree by the longer flange 19 provided thereby.

In Figs. 3 and 4, I have illustrated a modified form of section, wherein the side flanges 26 and 27 converge in the shape of a wedge. The wedge shape permits a more intimate engagement between the flanges and the electrode 24 when pressure is applied to the weld through the electrode 25. In Fig. 3, I have illustrated a bead 28 extending longitudinally of the web 16 between the shoulder 17 and the flange 26. The bead is useful in localizing the area of contact between the element 29 to be welded to the web.

As pointed out hereinabove, the shot method of welding is preferably employed, that limiting the duration of the weld to a fraction of a cycle and selecting the part of the cycle at which the weld occurs. This assures perfect welds while limiting the time and heat utilized. It was found when this method was employed on the channel sections as illustrated in the figures, that no burning or charring of the paper tacking element occurred.

Cross braces 31 join the front and rear frame portions 11 and 13, while longitudinally extending wires 32 join the sides 12 of the frame. The wires 31 and 32 are selected of such diameter as to eliminate the necessity of employing bracing elements always heretofore utilized. It will be noted from the figures that the endmost wires 31 are provided with offset portion 33, by which the seat is located and secured in position in a vehicle body. It is to be understood that the greater amount of bracing is required between the front and rear edges 11 and 13, and for this reason the wires 31 may be of heavier gauge than the longitudinally extending wires 32. A plurality of springs 34 rest upon the longitudinal wires 32 and wires 31 and are secured thereto by hog rings. The hog rings may cooperate with the wires 31 to prevent the shifting of the springs longitudinally of the seat. The rings may be alternately disposed on opposite sides of the wire or may span the point where the wires cross to anchor each individual spring against movement. Over the springs, a suitable pad 35 is disposed, covered by a trim material 36, which is drawn around the edges 11, 12 and 13 of the frame and tacked to the tacking strip. The unit seat thus constructed is extremely rigid, not only because a single strip of material is employed, but also because the elements 31 and 32 provide braces for the frame as well as forming supports for the springs. It is to be understood that the braces 31 and spring supporting elements 32 may be welded to each other to provide greater strength against flexing for the entire construction.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A seat frame embodying a border element of downwardly presented channel sections, the outer flange of which is of greater height than the inner flange, the web of which is offset to provide a shoulder, the web portion between said shoulder and inner flange being provided with a longitudinally disposed bead.

2. A seat frame embodying a border element of downwardly presented channel sections, the outer flange of which is of greater height than the inner flange, the web of which is offset to provide a shoulder, the web portion between said shoulder and inner flange being provided with a longitudinally disposed bead, elements extending across said frame and resting on said bead within the confines of said shoulders.

3. A seat frame embodying a border element of downwardly projecting channel section, the web of said channel element containing a longitudinally disposed bead, the web portion between said bead and outer flange being offset outwardly from said element forming a shoulder, and tacking material disposed in said channel.

4. A seat structure embodying a border element of downwardly projecting channel section, the web of said channel element containing a longitudinally disposed bead, the web portion between said bead and outer flange being offset outwardly from said element forming a shoulder, tacking material disposed in said channel, elements resting on said bead within the confines of said channels and welded thereto, and springs supported by said elements.

5. A seat frame embodying a border element channel section, the sides of which converge, a longitudinally disposed bead in the web of said section, a longitudinally disposed shoulder in said web between the bead and front flange, tacking material in said channel retained by the inwardly projecting edges of the flanges.

CLARENCE W. AVERY.